(12) United States Patent
Degnan

(10) Patent No.: US 7,248,342 B1
(45) Date of Patent: Jul. 24, 2007

(54) THREE-DIMENSION IMAGING LIDAR

(75) Inventor: John J. Degnan, Annapolis, MD (US)

(73) Assignee: United States of America as represented by the Administrator of the National Aeronautics and Space Administration, Washington, DC (US)

(*) Notice: Subject to any disclaimer, the term of this patent is extended or adjusted under 35 U.S.C. 154(b) by 542 days.

(21) Appl. No.: 10/730,195

(22) Filed: Dec. 5, 2003

Related U.S. Application Data

(60) Provisional application No. 60/448,602, filed on Feb. 14, 2003.

(51) Int. Cl.
G01C 3/08 (2006.01)

(52) U.S. Cl. .................. 356/5.01; 356/4.01; 356/5.01; 701/3; 701/4; 342/120; 342/121; 342/122

(58) Field of Classification Search .............. 356/5.01
See application file for complete search history.

(56) References Cited

U.S. PATENT DOCUMENTS

| | | | |
|---|---|---|---|
| 4,453,087 A | | 6/1984 | Linick |
| 4,470,698 A | * | 9/1984 | Green et al. ............. 356/141.4 |
| 4,502,751 A | | 3/1985 | Fjeldsted et al. |
| 4,850,686 A | | 7/1989 | Morimoto et al. |
| 5,272,325 A | | 12/1993 | Peng |
| 5,726,743 A | * | 3/1998 | Krawczyk ................ 356/28.5 |
| 5,964,432 A | | 10/1999 | Obkircher |
| 6,343,245 B1 | | 1/2002 | Degnan |

OTHER PUBLICATIONS

Degnan et al. "Design and perfromance of an airborne multikilohertz photon countihng microlaser altimeter", Int. Archives of Photogrammetry and remote Sensing, vol. XXXIV-3/W4, 22-14 Oct. 2001.*

Degnan, J. "Photon-counting multikilohertz microlaser altimeters for airborne and spaceborne topographic measurements", J. Geodynamics, Nov. 2002.

Degnan et al, "Design and performance of an airborne multikilohertz, photon-counting microlaser altimeter", Int. Archives of Photogrammetry and Remote Sensing, vol. XXXIV-3/W4, 22-14 Oct. 2001.

* cited by examiner

Primary Examiner—Thomas H. Tarcza
Assistant Examiner—Luke D. Ratcliffe
(74) Attorney, Agent, or Firm—Keith L. Dixon

(57) ABSTRACT

This invention is directed to a 3-dimensional imaging lidar, which utilizes modest power kHz rate lasers, array detectors, photon-counting multi-channel timing receivers, and dual wedge optical scanners with transmitter point-ahead correction to provide contiguous high spatial resolution mapping of surface features including ground, water, man-made objects, vegetation and submerged surfaces from an aircraft or a spacecraft.

25 Claims, 6 Drawing Sheets

Top View at t=0

Engineering Flight Parameters
- NASA P-3 Aircraft, Wallops Flight Center
- Locale: Chincoteague, VA & Chesapeake Bay
- Flight Altitudes: 3.5 to 6.7 km (11,000 to 22,000 ft)
- Early afternoon (maximum solar background)
- Laser Energy: <2 µJ @ 532 nm
- Laser Repetition Rate: 3.8 kHz
- Laser Power: ~7 mW
- Effective Telescope Diameter: 14 cm
- Mean Signal Strength per Laser Fire: ~0.88 pe

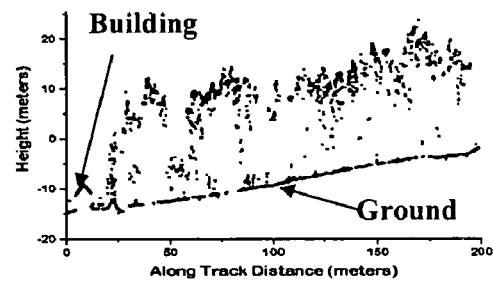

Tree Canopy Heights

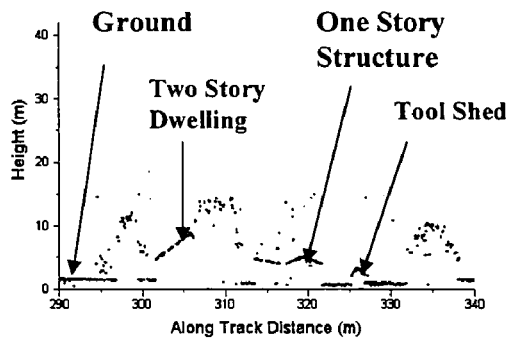

Buildings and Trees

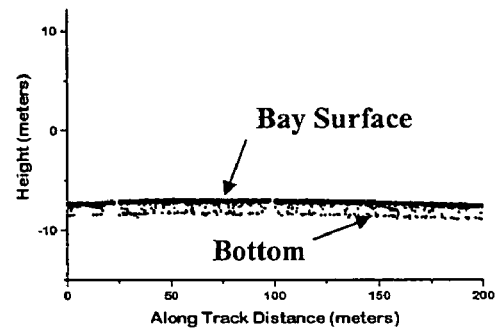

Shallow Water Bathymetry

Figure 5

THREE-DIMENSION IMAGING LIDAR

CROSS-REFERENCES TO RELATED APPLICATIONS

This application now formalizes and incorporates herein by reference Provisional Application Ser. No. 60/448,602, "SPACEBORNE 3D IMAGING LIDAR," John J. Degnan, filed on Feb. 14, 2003. Applicant claims the priority date thereof under 35 U.S.C. 119(e).

ORIGIN OF THE INVENTION

The invention described herein was made by an employee of the United States Government. Therefore, the invention may be manufactured and used by or for the Government for governmental purposes without the payment of any royalties thereon or therefor.

FIELD OF THE INVENTION

The invention relates to an optical scanning system and more particularly to a three-dimension imaging lidar.

BACKGROUND ART OF THE INVENTION

Over the past two decades, there has been an increasing interest in, and proliferation of, airborne laser altimeters, which measure the roundtrip time of flight of a laser pulse from an aircraft to a surface. High speed optical scanning devices of various types have been used to direct a train of high repetition rate (~10 kHz) laser pulses to an array of points on the ground. Combined with GPS Differential positioning, these instruments routinely provide 3D topographic maps over wide areas with point spacings on the order of a few meters and vertical (range) accuracies on the order of a decimeter. The applications for these devices are numerous and include commercial surveying of populated areas, biomass estimation and forestry management through the measurement of tree canopies and subcanopies, changes in sea and lake levels, the determination of hydrological runoff routes with application to flood control and hazard estimation, and even personal security applications. Sophisticated software packages, tailored to specific applications, can, for example, strip the surface of manmade structures and vegetation, revealing hidden fault lines of interest to geologists and geophysicists. Airborne instruments can provide useful local, and even regional, data, but many in the Earth science community desire comparable data on a global scale.

A small number of laser altimeters have operated in space. Altimeter data from three manned Apollo missions and the 1994 Clementine mission has recently been processed to provide a crude topographical map of the Moon. In the early 1970's, three of NASA's manned Apollo missions (15, 16, and 17) carried a low repetition rate (16 to 32 second fire interval) ruby laser altimeter to the Moon and provided approximately 7080 measurements of the command module height relative to the lunar topography. In 1994, the Clementine Mission operated for about two months at a substantially higher, but still low, laser fire rate of 2 Hz and provided a more robust set of 70,000 altimetric measurements during approximately two months in lunar orbit. A similar altimeter on the Near Earth Asteroid Rendezvous (NEAR) mission has recently provided a detailed topographic map of the asteroid EROS.

The largest body mapped to date by a laser is the planet Mars. NASA's Mars Orbiting Laser Altimeter (MOLA) instrument on the Mars Global Surveyor (MGS) spacecraft recently completed the first global topographic map of a planet from a near-polar orbit using an actively Q-switched, diode-pumped Nd:YAG laser operating at a repetition rate of 10 Hz. With an orbital ground velocity on the order of 3 km/sec, the along-track spacing between consecutive measurements was about 300 m. Like other missions, the MOLA instrument did not include a cross-track scanner, and hence only terrain directly below the spacecraft was interrogated under normal operating conditions. Periodically, however, the entire spacecraft was tilted via ground command to obtain data at or near the Martian poles. As with any near-polar orbit, the spatial concentration of range measurements is large at higher planetary latitudes and falls off dramatically as one approaches the Martian equator. Nevertheless, MOLA provided the most accurate global vertical height datum ever achieved from planetary orbit and was an unqualified engineering and scientific success.

First generation altimetric approaches are not well-suited to generating the few meter level horizontal resolution and decimeter precision vertical (range) resolution on the global scale desired by many in the Earth and planetary science communities. The first generation spaceborne altimeters have been characterized by a laser operating in the infrared (1064 nm) at a few tens of Hz with moderate output energies (50 to 100 mJ), a telescope in the 50 to 100 cm range, and a single element (i.e. non-pixellated) detector which detects and processes multi-photon returns from the surface. On bare terrain, the signal waveforms reflect the slope and surface roughness within the laser footprint (typically several tens of meters in diameter) as well as any false slopes due to pointing error. On Earth, the presence of manmade buildings and volumetric scatterers (such as tree canopies or other vegetation) generally makes waveform interpretation more complex and difficult.

Clearly, one major challenge to the conventional approach is the sheer number of measurements required over a nominal mission lifetime of two to three years. For example, in order to generate a 5 m×5 m vertical grid map of Mars, which has a mean volumetric radius of 3390 km, over 7 trillion individual range measurements are required, even if one makes the unrealistic assumption that no ground spatial element is measured twice. In any realistic mission, the actual number of range measurements will be significantly larger since an instrument designed to provide contiguous coverage at the planetary equator will oversample the higher latitudes where the ground tracks are more narrowly spaced. If one were to simply scale conventional approaches, one would clearly face severe prime power, weight, and instrument longevity issues.

A second technical challenge is the high ground speed of the spacecraft (about 3 km/sec for a nominal 300 km altitude Mars orbit) coupled with the need to incorporate a scanner to cover the large area between adjacent ground tracks, especially near the equator. At a nominal altitude of 300 km, for example, the satellite would have an orbital period about Mars of approximately 113 minutes. Thus, a three year mission would produce 13,910 orbits or 27,820 equator crossings with an average spacing between ground tracks at the equator of 766 meters. The latter spacing corresponds to about 154 resolution elements ($\Delta=5$ m) in the cross-track direction between adjacent ground tracks and further implies a minimum cross-track scan angle of about 0.15 degrees. For truly contiguous coverage using a conventional single element detector, these 154 cross-track measurements must be completed in the time it takes the spacecraft to move one resolution element in the along-track direction, or within 1.67 msec. This implies a rather daunting laser fire rate of 92.4 kHz. Furthermore, a uniformly rotating mechanical scanner, for example, must complete a half cycle of its movement within the same 1.67 msec period, i.e. an impossible 300 Hz (18,000 RPM) rate. While alternative non-mechanical scanners, such as electro-optic or acousto-optic devices, are capable of very high scanning speeds and have no moving parts, they fall far short of the angular range requirements, are highly limited in their useful aperture, and require fast high voltage or high RF power drivers.

An additional technical challenge stems from the high laser fire rate and the long pulse time of flight (TOF). At 300 km altitude, the laser pulse completes a roundtrip transit to the surface in 2 msec. Thus, for laser fire rates in excess of 500 Hz, multiple pulses will be in flight simultaneously. In principle, it is easy to associate the correct return pulse with the appropriate outgoing pulse provided the roundtrip satellite-to-surface TOF is known a priori to well within a single laser fire interval. For the 92.4 kHz rate derived previously, however, approximately 185 pulses would be simultaneously in transit, and it would be necessary to have a priori orbital knowledge at the 1.6 km level in order to unambiguously tie a given surface return to the appropriate output pulse. While such a navigation accuracy might be easy to achieve in Earth orbit using either Global Positioning System (GPS) receivers or Satellite Laser Ranging (SLR) to passive reflectors on the spacecraft, it would likely be a much more difficult challenge in orbits about extraterrestrial bodies.

A second technical problem associated with the longer pulse TOF from orbit is related to "transmitter point-ahead", i.e. the offset between the center of the laser beam at the surface and where the receiver is looking one 2 msec round trip transit time later. For an unscanned system, the offset due to a 3 km/sec spacecraft ground velocity is only 6 m (slightly more than one resolution element) in the along-track direction and can be easily accommodated, either by a fixed offset of the transmitter in the positive along-track direction or by a modest increase in the receiver field of view (FOV). In the current example, however, the scanner must complete over half a cycle of its scan within the pulse TOF. Thus, the receiver FOV must be opened up to span the full 0.15 degree separation (766 m) between ground tracks in the cross-track dimension while the laser illuminates only a 5 m diameter circle within that FOV and defines the ground resolution element being interrogated. This approach greatly increases the solar background noise incident on the detector during local daytime operations relative to the unscanned case and elevates the laser output energy requirements for good discrimination of the signal. An alternative low noise approach would be to independently steer the transmitter and receiver, which will be discussed in later sections.

SUMMARY OF THE INVENTION

The present invention is directed to an imaging lidar system aboard an aircraft or a spacecraft. The imaging lidar system includes a light source transmitting a first beam of light, means for scanning both the first beam of light transmitted to surface of the ground and a second beam of light received from the surface of the ground, wherein transmission scanning of field of view of the surface is ahead of reception scanning of field of view of the surface, means for detecting the second beam of light received from the scanning means and generating signals responsive to the light; and a processor system for processing signals from the detecting means.

The present invention is directed to another embodiment of an imaging lidar system aboard an aircraft or a spacecraft. The imaging lidar system includes a light source transmitting a first beam of light, means for scanning both the first beam of light transmitted to surface of the ground and a second beam of light received from the surface of the ground, wherein transmission scanning of field of view of the surface is ahead of reception scanning of field of view of the surface, an array of two-dimensional pixellated detectors for detecting the second beam of light received from the scanning means and generating signals responsive to the light, and a processor system for processing signals from the detectors.

The present invention is directed to an additional embodiment of an imaging lidar system aboard an aircraft or a spacecraft. The imaging lidar system includes a light source transmitting a first beam of light, an optical scanner comprising, a first optical wedge, with a first cone half-angle, comprising a central portion and an annular portion, a second optical wedge, with a second cone half-angle, comprising a central portion and an annular portion, wherein phases of the central portions of the first and the second optical wedges are advanced relative to phases of the annular portions of the first and the second optical wedges, respectively, and means for counter-rotating the first and the second optical wedges whereby rotation of one of the optical wedges is in one direction while rotation of the other optical wedge is in the opposite direction and with a fixed phase offset $\Delta\phi$, and means for detecting the second beam of light received from the scanning means and generating signals responsive to the light, and a processor system for processing signals from the detecting means.

The present invention is directed to a further embodiment of an imaging lidar system aboard an aircraft or a spacecraft. The imaging lidar system includes a light source transmitting a first beam of light, a optical scanner comprising a first optical wedge, with a first cone half-angle, comprising a central portion and an annular portion, a second optical wedge, with a second cone half-angle, comprising a central portion and an annular portion, wherein phases of the central portions of the first and the second optical wedges are advanced relative to phases of the annular portions of the first and the second optical wedges, respectively, and means for counter-rotating the first and the second optical wedges whereby rotation of one of the optical wedges is in one direction while rotation of the other optical wedge is in the opposite direction and with a fixed phase offset $\Delta\phi$, and an array of two-dimensional pixellated detectors for detecting the second beam of light received from the scanning means and generating signals responsive to the light, and a processor system for processing signals from the detectors.

The present invention is also directed to a method of imaging a contiguous map of ground from an aircraft or a spacecraft. The method includes the steps of providing a laser beam, scanning the laser beam transmitted to surface of the ground, scanning the laser beam received from the surface of the ground, wherein transmission scanning of field of view of the surface is ahead of reception scanning of field of view of the surface, detecting the laser beam returned from the surface of the ground, and processing signals responsive to the returned beam.

BRIEF DESCRIPTION OF THE DRAWINGS

The preferred embodiments of the invention will now be described in detail with reference to the figures, in which:

FIG. 5 shows results of an engineering aircraft flight of the 3-D lidar imaging system.

DETAILED DESCRIPTION OF PREFERRED EMBODIMENTS OF THE INVENTION

Figure 1:
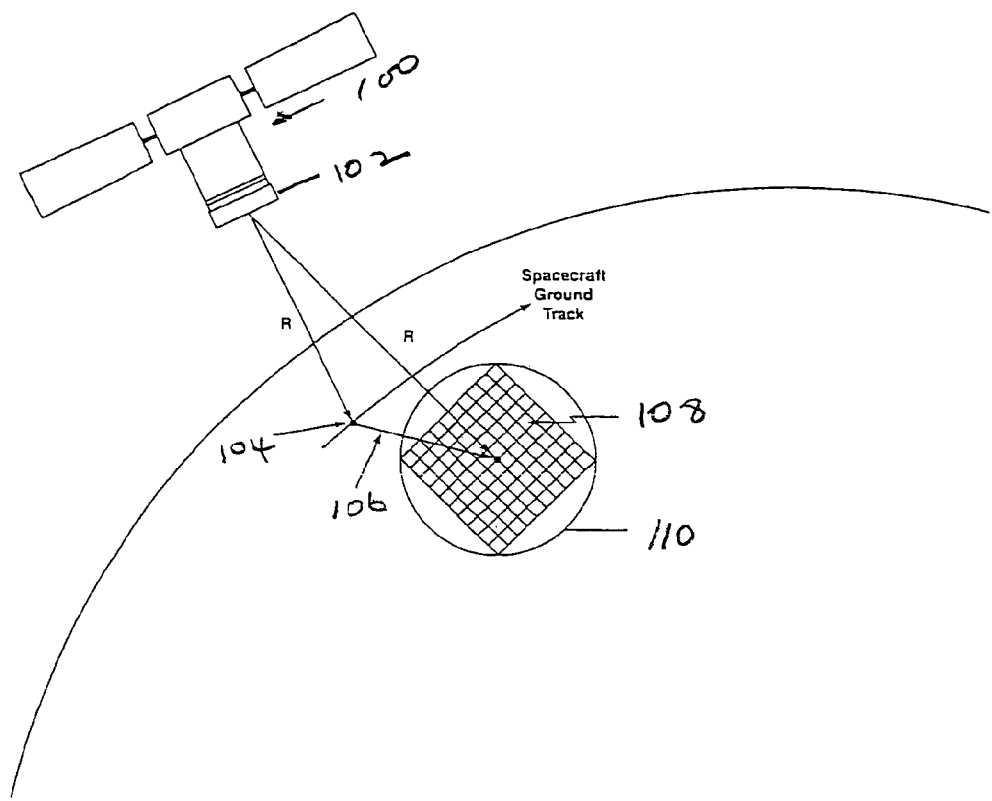
FIG. 1 shows a diagram of a planetary mapper showing the projection of the square detector array on a surface.

This invention is directed to an optical scanning system for transmitting and receiving light beams. A three dimension (3-D) imaging lidar overcomes major technological impediments to achieving few meter transverse resolutions. The 3-D imaging lidar includes modest power kHz rate lasers, array detectors, photon-counting multi-channel timing receivers, and dual wedge optical scanners.

Array Detectors

The unrealistically high laser fire rates and scan rates previously described above can only be ameliorated by making many spatially resolved measurements within a single pulse. This can be accomplished by replacing the single element detector with a highly pixellated array detector. The ground scene is then imaged by the receiver telescope onto the array such that each pixel records the laser photon returns from a single 5 m×5 m resolution element on the planetary surface (along with noise) and inputs them into a separate timing channel. Of course, one must now provide a multi-channel timing receiver with the number of channels equal to the number of pixels, but this can be accomplished within a reasonable volume and weight (<2.5 kg) for a receiver having on the order of 100 timing channels or less.

Examples of high speed detectors suitable for precise multichannel ranging include segmented anode photomultipliers (PMT's) and Avalanche Photodiode Arrays (APD's), however other detectors may be used. The former are relatively inexpensive, can be obtained commercially with up to 100 anode elements (10×10), and have single photon sensitivity, large active apertures, subnanosecond rise times, and high internal gains ($5 \times 10^6$).

Additionally, microchannel plate PMT's offer low transit time jitter, due to the highly restricted electron multiplication path, and zero dead time, since the likelihood of multiple photons hitting the same microchannel is exceedingly small. When equipped with conventional bi-alkali or multi-alkali cathodes, PMT's typically have quantum efficiencies (QE's) on the order 10% to 15% at 532 nm, a wavelength corresponding to the second harmonic of the Nd:YAG laser. More exotic cathodes such as GaAs and GaAsP permit visible QE's in the 30% and 40% range respectively whereas photon counting detectors at the fundamental Nd:YAG wavelength of 1064 nm are typically an order of magnitude less efficient when used in photon counting mode. High speed APD arrays operating in photon-counting or Geiger mode are typically more expensive and less mature technically than PMT's, have relatively long dead times (~50 nsec) even with active quenching circuits, and the dead space created in the active aperture by the need for these circuits must often be compensated for by the use of microlens arrays. On the other hand, APD arrays offer the promise of still higher quantum efficiencies in the visible, on the order of 50% to 70%, as well as larger array sizes (32×32 or greater). Various high efficiency hybrid devices such as IPD's are also commercially available.

For truly contiguous and photon-efficient mapping, the laser beam properties must be chosen to provide maximum overlap with the projected ground image of the detector array such that there is a high probability of recording one or more signal photons per pixel per laser fire. Furthermore, solar background noise from areas not illuminated by the laser must be kept to a minimum.

The linear array, or "pushbroom", approach has the advantages that it would eliminate the need for an optical scanner and greatly simplify the accommodation of transmitter point ahead. However, we would require 154 linear pixels (and corresponding timing channels), for example, if we were to cover our nominal 766 m spacing between adjacent ground tracks at Mars with 5 m resolution. Furthermore, efficient illumination demands the use of holographic, cylindrical and/or fiber optics to convert the nominally circular laser beam to a more efficient linear strip of light on the ground (766 m×5 m in our Mars example). For effective noise control, the receiver must also be configured to image only the light emanating from the same strip onto the array in order to eliminate any additional background noise from non-illuminated areas.

An alternative pushbroom approach, which eliminates the need for exotic optics, would be to use m laser transmitters with a rectangular M×N array viewing the area illuminated by all of the independent transmitters. Clearly, a square array provides a more efficient overlap with a nominally circular laser beam than a rectangular array. Each transmitter would therefore be pointed to fill the field of view of an N×N sub-array within the larger M×N rectangular array. Each laser would then fire at a repetition rate equal to the ground velocity divided by the linear dimension of the grid projected onto the ground, or $v_g/N\Delta = 600$ Hz/N. However, the condition M=m×N~154 would lead to a very large number of independent ranging components including m transmitters and $mN^2$ detectors, amplifiers, discriminators, and timing channels. For N=10, one would need 16 transmitters operating at 60 Hz and 1600 detector pixels and timing channels.

The simplest approach is to use a single square two-dimensional array and an optical scanner 102 of a spacecraft 100 as shown in FIG. 1. If one assumes an N×N detector array, a single laser pulse can in principle measure the range to $N^2$ resolution elements, thereby reducing the laser repetition rate and the number of laser fires required to obtain contiguous global coverage by the same factor. It also relaxes the angular beam divergence requirement on the laser by a factor of N, which in turn reduces the aperture areas of the transmitter telescope and scanner by $N^2$ with corresponding benefits in overall instrument weight, volume, and prime power usage. Furthermore, for a given spacecraft ground speed, it now takes N times as long for the spacecraft to traverse the receiver FOV in the along track direction, and the required scanner frequency for a contiguous map is therefore reduced by a factor of N.

Assuming a value N=10 in the Mars example, FIG. 1 shows a projected ground image of 10×10 detector array 108 enclosed by a laser ground spot 110, which due to the point-ahead correction is displaced by scanner offset vector 106 from spacecraft ground position 104 at t=0. Vectors from spacecraft to the space ground position 104 and center position of the laser ground spot 110 are defined as R and R', respectively. A single pulse will now interrogate a 50 m×50 m area on the ground or 100 resolution elements. The laser fire rate can therefore be reduced by two orders of magnitude from 92.4 kHz to less than a kHz (924 Hz), and the scanner frequency can be reduced from 300 Hz (18,000 RPM) to a more manageable 30 Hz (1800 RPM). Furthermore, the required aperture for the transmitting optics and scanner is reduced by two orders of magnitude in area, relative to the single element detector case, due to the relaxed beam divergence enabled by the array detector. At 300 km altitude, a 50 m diameter laser ground spot can be produced from a final transmit aperture approximately 1 cm in diameter assuming a laser operating in its lowest order $TEM_{00}$ spatial mode.

Although the reduced scan rate also decreases the "point-ahead" displacement between the transmitter and receiver by a factor of 10, the displacement can still be large (up to ~100 m) relative to the new and enlarged 50 m laser spot diameter. Since enlarging the transmitter spot on the ground to ensure a partial overlap with the array would be grossly inefficient, the transmitter and receiver FOV's must be independently steered so they tightly overlap at all times during the scan. A simple scanner design with "point-ahead" compensation is described in the next section.

Dual Wedge Scanner with Transmitter Point-Ahead

A variety of optical scanners have been used in airborne lidars and altimeters. To date most of optical scanners have been mechanical in nature due to the need for wide angular sweeps for maximum a real coverage at typical aircraft altitudes. Spaceborne lidars place additional constraints on the type of scanner used. Clearly, weight, size, reliability, flexibility, suitability of the scan pattern, and prime power requirements are all important factors in choosing a scanner for space use.

In space applications, uniformly rotating devices are generally viewed by aerospace engineers as more reliable and efficient than other mechanical devices. First of all, they are the simplest to implement, monitor, and control. Secondly, rotating scanners tend to be power efficient since, once rotating, the force applied is devoted to simply overcoming bearing or gear/belt friction. Alternative scanner types, such as a programmable two axis mirror, may offer greater flexibility in providing a more optimum scan pattern, but they must be made larger to avoid aperture vignetting and must also undergo more complex motions characterized by constant accelerations and decelerations. As a result, they consume more prime power while introducing more mechanical stress, volume, and mass.

Rotational scanners include reflective devices, such as spinning mirrors or polygons, as well as transmissive devices, such as spinning optical wedges or holographic elements. Unfortunately, conservation of total angular momentum dictates that any net angular momentum introduced by the rotating scanner will be balanced by an equal induced angular momentum in the spacecraft, which is clearly undesirable from a spacecraft control standpoint. Thus, optical scanners that impart no net angular momentum are the preferred approach for spacecraft missions, and this can be achieved through the use of counter-rotating optical elements having equal but opposite angular momenta.

Figure 2B:
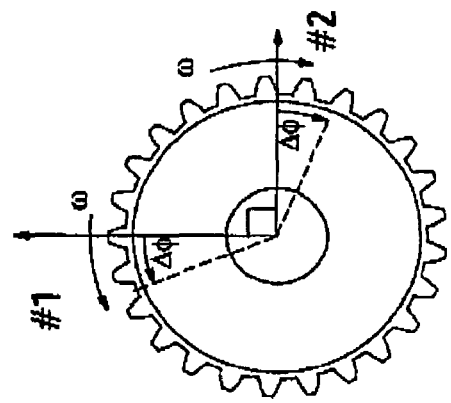
FIG. 2(b) shows a top view of the two optical wedges of FIG. 2(a) at t=0.
Figure 2A:
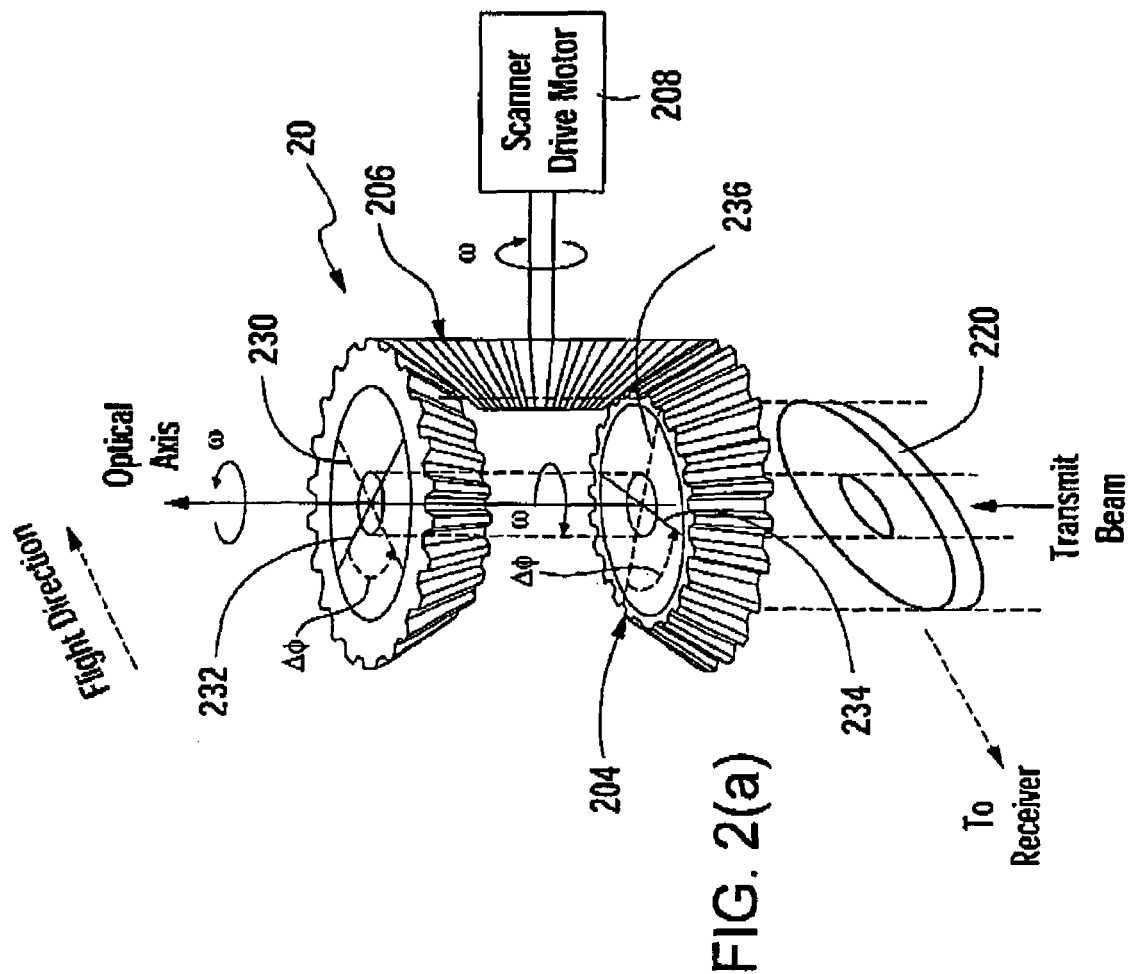
FIG. 2(a) shows a diagram of a dual wedge optical scanner.
Figure 2C:
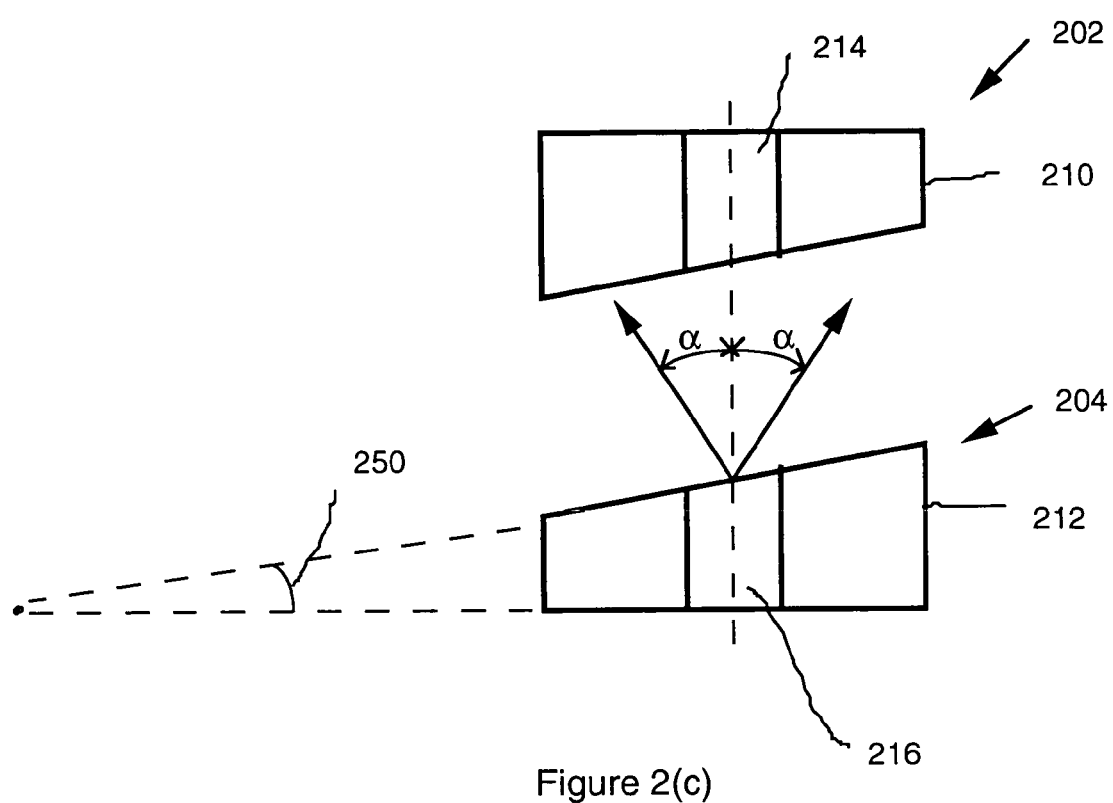
FIG. 2(c) shows a side view of the two optical wedges of FIG. 2(a) at t=0.
Figure 4:
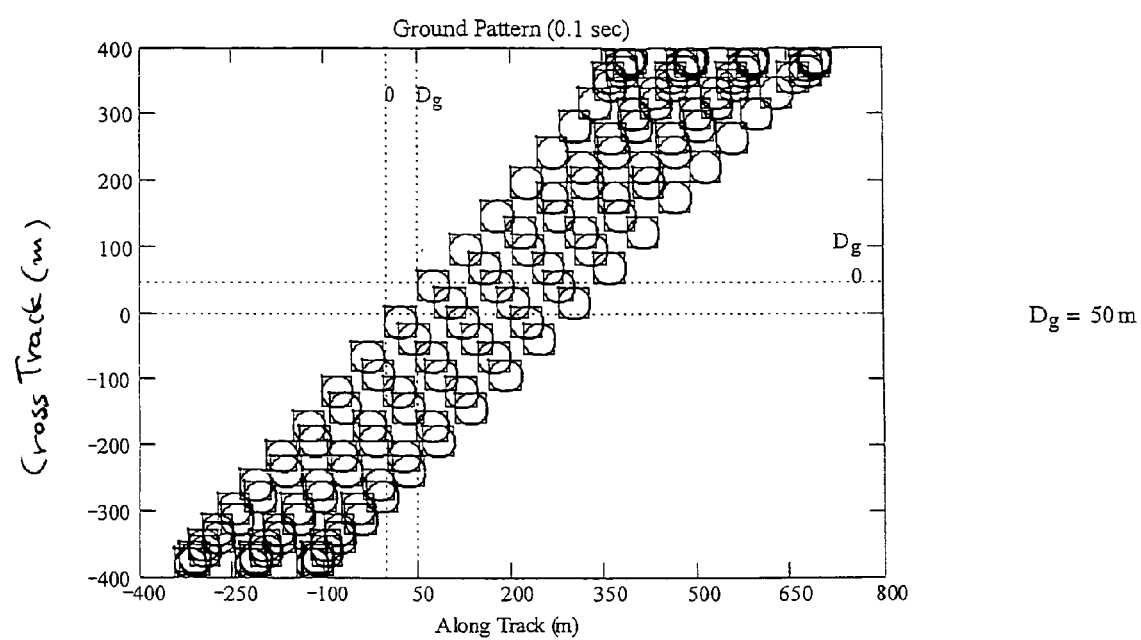
FIG. 4 shows a ground pattern created by the dual wedge scanner; and shown in FIG. 2.

FIG. 2(a)-(c) show a transmissive optical scanner 20 including two equivalent optical wedges 202, 204 which are rotated at the same angular speed, but in opposite directions, by a common rotor 206. The angular range of the scan and the ground pattern can be easily optimized for a given application by adjusting the magnitude of the cone half-angle, $\alpha$, produced by an individual optical wedge and the relative starting phase of the plates, $\Delta\phi$. The instantaneous position of the receiver FOV on the ground at time t is then given by the equations:

$$x(t) = v_g t + R \tan \alpha [\cos \omega t + \cos(-\omega t + \Delta\phi)]$$

$$y(t) = R \tan \alpha [\sin \omega t + \sin(-\omega t + \Delta\phi)] \quad (1)$$

where $v_g$ is the spacecraft ground velocity in the positive x-direction and $\omega$ is the angular velocity of the counter-rotating plates. As described in FIG. 2(a), a single motor 208 can be used to drive both plates 202, 204 via a simple gearing arrangement, which also maintains the relative phase between the two plates 202, 204 indefinitely. Choosing $\Delta\phi=90°$ provides a fairly uniform scan pattern for mapping as illustrated in FIG. 4. In addition, the two equivalent optical wedges 202, 204 can be electronically interconnected and driven by two separate motors and motor drivers.

U.S. Pat. No. 5,272,325, which is incorporated by reference, teaches a method of generating different scanning patterns by projecting a laser beam onto two rotating optical wedges. U.S. Pat. No. 4,850,686, which is also incorporated by reference, teaches an apparatus for adjusting light beam direction, the apparatus comprising two prisms. Applying teachings of these two patents, it is possible to create different scan patterns for mapping.

By the time the receiver views the photons returning from the surface, each of the optical wedges has advanced in phase, relative to the time of laser fire, by an approximate angle $\Delta\phi=2R\omega/c$ where $\omega$ is the angular frequency of the rotating plate and 2 R/c is the nominal roundtrip transit time of the pulse to the surface. Thus, the receiver FOV is displaced from the area of illumination on the ground, and, at spacecraft altitudes, this displacement can be quite large for fast-moving scanners. In order to compensate for transmitter point-ahead, each wedge 202, 204 consists of a central 214, 216 and an annular portion 210, 212. The inner central wedge 214, 216 scans the transmitter while the outer annular wedge 210, 212 scans the receiver. Transmitter point-ahead is accomplished by advancing the phases of the central counter-rotating transmitter wedges 214, 216 relative to their corresponding annular receiver wedges 210, 212 by $\Delta\phi$ at t=0 as shown in FIG. 2(b). In other words, the central wedge axis 230 is an imaginary line connecting the thickest point with the thinnest point of the central wedge and the annular wedge axis 232 is an imaginary line connecting the thickest point with the thinnest point of the annular wedge. In the first optical wedge 202, there is a relative phase angle $\Delta\phi$ between the central wedge axis 230 and the annular wedge axis 232 at t=0. Conversely the relative angle $\Delta\phi$ also exists between the central wedge axis 236 and annular wedge axis 234 of second optical wedge 204.

Figure 3:
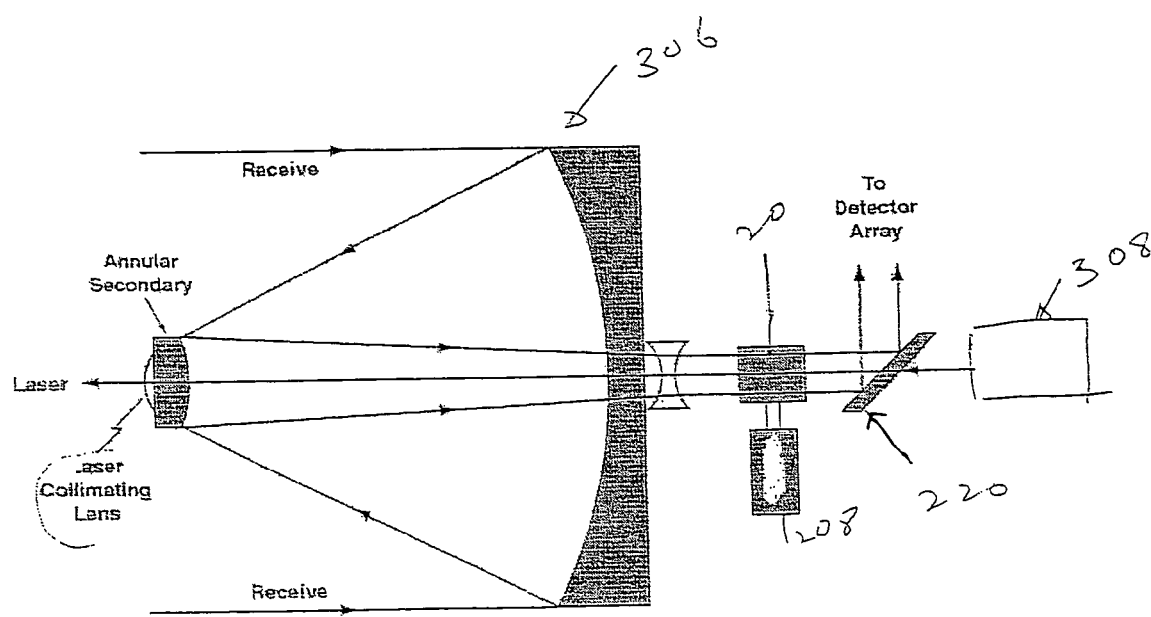
FIG. 3 shows a functional block diagram of the 3-D imaging lidar.

The point-ahead effect due to the linear velocity of the spacecraft, $v_g$, can also be compensated for by introducing an additional small angular displacement, $\Delta\psi=2v_g/c$, of the transmitter beam in the forward direction of the spacecraft motion using a prism or mirror 220 at the input to the scanner as in FIG. 3. The effectiveness of these point ahead corrections is illustrated in FIG. 4 where the circles represent the transmitted laser beam on the ground and the squares represent the projected images of the detector array. Small variations in the spacecraft altitude above the surface can be caused by slight orbital ellipticity, planetary topography, or gravity variations. In our current Mars example, these will cause a maximum decentering of the transmit and receive FOV's near the ground track on the order of 1 m per % variation in altitude and much smaller variations near the edge of the scan where the ground beam velocity is significantly reduced.

FIG. 3 shows a block diagram of a space imaging lidar including the dual wedge scanner 20, a motor 208, a laser 308, a mirror 220, and a telescope 306, which transmits the laser beam and receives and collimates the beam returning from the surface prior to scanning by the dual optical wedge scanner 20.

U.S. Pat. No. 6,343,245, entitled "Microaltimeter", invented by the same inventor as this patent application, John J. Degnan, is incorporated by reference and teaches a method of measuring range from an orbiting vehicle by transmitting laser pulses to a planetary surface and measuring and processing single photons returned from the surface. The technique was recently demonstrated on an aircraft using a tiny (8 mm$^3$), low energy (2 µJ), passively Q-switched microchip Nd:YAG laser transmitter operating at multi-kHz rates at altitudes up to 6.7 km [Degnan et al, "Design and performance of an airborne multikilohertz, photon-counting microlaser altimeter", Int. Archives of Photogrammetry and Remote Sensing, Vol. XXXIV-3/W4, 22-14 October 2001]. As shown from the raw engineering flight data in FIG. 5, the system successfully recorded returns from buildings, trees (plus underlying terrain), and water surfaces and was even able to perform shallow water bathymetry at depths up to two meters. The data in the figure was taken at mid-day in 2D profiling mode with a quadrant PMT detector, but the system also includes a simple optical wedge scanner, which superimposes a circular scan onto the linear forward motion of the aircraft for generating wide swaths and 3D topographic maps. The mean signal strength per laser fire was on the order of 1 pe or less at 532 nm, and the receiver was designed to provide up to 16 stops per laser fire or 4 per quadrant. The signal was easily extracted from the solar background using post-detection Poisson filtering techniques. In the application cited here, the intent would be to collect a few photoelectrons per detector pixel in order to have a high probability of detection and a complete 3D image on each laser fire. [Degnan, J. "Photon-counting multi-kilohertz microlaser altimeters for airborne and spaceborne topographic measurements", J. Geodynamics, November 2002]

Regarding longevity of the laser, one advantage of low energy, high repetition rate, laser transmitters is that they can be pumped by diode laser arrays operating in CW mode and passively Q-switched by a saturable absorber. Claims of CW laser diode lifetimes in excess of 50,000 hours (>5 years) are not uncommon and, with adequate derating and redundant transmitters onboard, may actually meet the three year mission (26,000 hrs) life assumed here. High energy lasers, on the other hand, are usually pumped by pulse-pumped diodes. Under this mode of operation, the higher peak currents place more electrical and mechanical stress on the diodes, and one is usually delighted to achieve a lifetime of a few billion shots, a number far short of the almost 100 billion needed for a nominal 3 year Mars mission.

If one requires meter aperture receive optics to achieve the necessary signal strengths, it is not practical to install the optical scanner 20 in front of the receive telescope 306 as was done in our aircraft experiments as shown in FIG. 5. Instead, a much smaller scanner would be inserted in a common transmit/receive path prior to the final magnifying telescope, e.g. after an annular mirror 220 which reflects the receive energy and passes the transmitter beam through the central hole as in FIG. 3. This clearly saves a great deal of weight and reduces the power required to overcome friction. To prevent the outgoing laser beam from being blocked by a central obscuration, such as the secondary mirror on a Cassegrain telescope, a small diameter pathway on the order of a centimeter or two could be provided through the secondary and a small collimating lens placed at the output as in FIG. 3. Alternatively, an off-axis telescope design without central obscuration can be used. The wedge angles 250 would be adjusted to compensate for the final magnification in the transmitter and receiver paths so that they create equal angular scans at the output.

Scanner longevity is certainly helped by the use of uniformly rotating components. Momentum wheels have been used for years in space to control the pointing of spacecraft and various instruments. Recent devices with several inch diameters have operated at speeds up to 3000 RPM (50 Hz) and have demonstrated lifetimes in excess of four years. Achieving these higher speeds in an optical scanner would largely remove a major impediment to realizing contiguous high spatial resolution mapping from Earth orbit.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An imaging lidar system aboard an aircraft or a spacecraft comprising:
    a light source transmitting a first beam of light;
    a scanner for scanning both the first beam of light transmitted to the surface of the ground and a second beam of light received from the surface of the ground, wherein transmission scanning of the field of view of the surface is ahead of reception scanning of the field of view of the surface;
    a detector for detecting the second beam of light received from the scanner and generating signals responsive to the light, wherein the detector comprises a photon detector that includes an array of two-dimensional pixellated detectors for detecting the second beam of light received from the scanner and generating signals responsive to the light;
    a processor system for processing signals from the detector; and,
    a multi-channel timing receiver wherein the number of channels is equal to the number of pixels in the array detectors.

2. The imaging lidar system as in claim 1, wherein the light source includes a laser.

3. The imaging lidar system as in claim 2, wherein the laser is pumped by diode laser arrays operating in CW mode and passively Q-switched by a saturable absorber.

4. The imaging lidar system as in claim 1 further comprising:
    means for angularly displacing the transmitter beam in the forward direction of the lidar system motion at the input to the scanner.

5. The imaging lidar system as in claim 4, wherein the angularly displacing means include a prism or a mirror.

6. An imaging lidar system aboard an aircraft or a spacecraft comprising:
   a light source transmitting a first beam of light;
   means for scanning both the first beam of light transmitted to the surface of the ground and a second beam of light received from the surface of the ground, wherein transmission scanning of the field of view of the surface is ahead of reception scanning of the field of view of the surface;
   means for detecting the second beam of light received from the scanning means and generating signals responsive to the light wherein the detector means comprises a photon detector that includes an array of two-dimensional pixellated detectors for detecting the second beam of light received from the scanning means and generating signals responsive to the light;
   a processor system for processing signals from the detector means; and,
   a multi-channel timing receiver wherein the number of channels is equal to the number of pixels in the array detectors.

7. The imaging lidar system as in claim 6, wherein the means for scanning includes a dual wedge scanner comprising:
   a first optical wedge, with a first cone half-angle, comprising a central portion and an annular portion;
   a second optical wedge, with a second cone half-angle, comprising a central portion and an annular portion wherein phases of the central portions of the first and the second optical wedges are advanced relative to phases of the annular portions of the first and the second optical wedges, respectively; and
   means for counter-rotating the first and the second optical wedges whereby the rotation of one of the optical wedges is in one direction while the rotation of the other optical wedge is in the opposite direction.

8. The imaging lidar system as in claim 7, wherein the instantaneous position of the receiver field of view on the surface at time t is determined by the following equations:

$$x(t) = v_g t + R \tan \alpha [\cos \omega t + \cos(-\omega t + \Delta\phi)]$$

$$y(t) = R \tan \alpha [\sin \omega t + \sin(-\omega t + \Delta\phi)]$$

wherein $v_g$ is the ground velocity of an aircraft or a spacecraft in the positive x-direction;
   $\omega$ is the angular velocity of the counter-rotating optical wedges; $\alpha$ is the cone half-angle of optical wedges; R is the perpendicular distance from the scanner to the surface; and
   $\Delta\phi$ is the relative starting phase of the optical wedges.

9. The imaging lidar system as in claim 7, wherein the means for counter-rotating the first and second optical wedges comprises in combination:
   a first annular bevel gear connected relative to the first optical wedge;
   a second annular bevel gear connected relative to the second optical wedge;
   a bevel miter gear rotatably journaled between the first annular bevel gear and the second annular bevel gear for engagement therewith;
   a motor; and
   means for operatively connecting said motor to the first optical wedge, the second optical wedge or the bevel miter gear whereby rotation of one of the wedges in one direction will rotate the other of the wedges in the opposite direction.

10. The imaging lidar system as in claim 7, wherein the means for counter-rotating the first and second optical wedges comprises in combination:
    a first annular bevel gear connected relative to the first optical wedge;
    a second annular bevel gear connected relative to the second optical wedge;
    a first motor means for rotating the first annular bevel gear;
    a second motor means for rotating the second annular bevel gear; and,
    means for driving said first motor means and said second motor means in the opposite directions at the angular velocity of $\omega$ and with a fixed phase offset $\Delta\phi$.

11. The imaging lidar system as in claim 7, wherein the first and the second wedges are in a constant rotating motion.

12. The imaging lidar system as in claim 6, further comprising means for determining and controlling scan frequency of the scanning means.

13. The imaging lidar system as in claim 6, further comprising a telescope that transmit the first beam and receives and collimates the second light beam returned from the surface prior to the scanning means.

14. An imaging lidar system aboard an aircraft or a spacecraft comprising:
    a light source transmitting a first beam of light;
        means for scanning both the first beam of light transmitted to surface of the ground and a second beam of light received from the surface of the ground, wherein transmission scanning of field of view of the surface is ahead of reception scanning of field of view of the surface;
        an array of two-dimensional pixellated detectors for detecting the second beam of light received from the scanning means and generating signals responsive to the light; and
        a processor system for processing signals from the detectors wherein said processor system includes a multi-channel timing receiver wherein the number of channels is equal to the number of pixels in the array detectors.

15. An imaging lidar system aboard an aircraft or a spacecraft comprising:
    a light source transmitting a first beam of light;
    a optical scanner comprising:
    a first optical wedge, with a first cone half-angle, comprising a central portion and an annular portion;
    a second optical wedge, with a second cone half-angle, comprising a central portion and an annular portion;
    wherein phases of the central portions of the first and the second optical wedges are advanced relative to phases of the annular portions of the first and the second optical wedges, respectively; and
    means for counter-rotating the first and the second optical wedges whereby rotation of one of the optical wedges is in one direction while rotation of the other optical wedge is in the opposite direction and with a fixed phase offset $\Delta\phi$; and
    means for detecting the second beam of light received from the scanning means and generating signals responsive to the light; and a processor system for processing signals from the detecting means.

16. An imaging lidar system aboard an aircraft or a spacecraft comprising:
a light source transmitting a first beam of light;
a optical scanner comprising:
a first optical wedge, with a first cone half-angle, comprising a central portion and an annular portion;
a second optical wedge, with a second cone half-angle, comprising a central portion and an annular portion;
wherein phases of the central portions of the first and the second optical wedges are advanced relative to phases of the annular portions of the first and the second optical wedges, respectively; and
means for counter-rotating the first and the second optical wedges whereby rotation of one of the optical wedges is in one direction while rotation of the other optical wedge is in the opposite direction and with a fixed phase offset $\Delta\phi$; and
an array of two-dimensional pixellated detectors for detecting the second beam of light received from the scanning means and generating signals responsive to the light; and
a processor system for processing signals from the detectors.

17. A method of imaging a contiguous map of ground from an aircraft or a spacecraft comprising:
providing a laser beam;
scanning the laser beam transmitted to a surface of the around;
scanning the laser beam received from the surface of the ground such that transmission scanning of the field of view of the surface is ahead of reception scanning of field of view of the surface wherein the step of scanning the transmission beam and the step of the scanning the reception beam are effected by a dual wedge scanner comprising:
a first optical wedge, with a first cone half-angle, comprising a central portion and an annular portion;
a second optical wedge, with a second cone half-angle, comprising a central portion and an annular portion;
wherein phases of the central portions of the first and the second optical wedges are advanced relative to phases of the annular portions of the first and the second optical wedges, respectively;
counter-rotating the first and the second optical wedges whereby rotation of one of the optical wedges is in one direction while rotation of the other optical wedge is in the opposite direction; and,
detecting the laser beam returned from the surface of the ground and processing a signals responsive to the returned beam.

18. The method of imaging in claim 17, wherein the laser beam is pumped by diode laser arrays operating in CW mode and passively Q-switched by a saturable absorber.

19. The method of imaging in claim 17, wherein the instantaneous position of the receiver field of view on the surface at time t is determined by the following equations:

$x(t)=\theta_R r + R \tan\alpha[\cos\omega t + \cos(-\omega t + \Delta\phi)]$ $y(t)=R \tan\alpha[\sin\omega t + \sin(-\omega t + \Delta\phi)]$ wherein $v_g$ is the ground velocity an aircraft or a spacecraft in the positive x-direction; $\omega$ is the angular velocity of the counter-rotating optical wedges; $\alpha$ is the cone half-angle of optical wedges; R is the perpendicular distance from the scanner to the surface; and $\Delta\phi$ is the relative starting phase of the optical wedges.

20. The method of imaging in claim 17, wherein the means for counter-rotating the first and second optical wedges comprises in combination:
a first annular bevel gear connected relative to the first optical wedge;
a second annular bevel gear connected relative to the second optical wedge;
a bevel miter gear rotatably journaled between the first annular bevel gear and the second annular bevel gear for engagement therewith;
motor means; and
means for operatively connecting said motor means to the first optical wedge, the second optical wedge or the bevel miter gear whereby rotation of one of the wedges in one direction will rotate the other of the wedges in the opposite direction.

21. The method of imaging in claim 17, further comprising:
angularly displacing the laser beam in the forward direction of the motion of an aircraft or a spacecraft prior to the step of scanning the laser beam transmitted to surface.

22. The method of imaging in claim 21, wherein the step of angularly displacing the laser beam is effected by passing the beam through a prism or a mirror.

23. The method of imaging in claim 17, wherein the step of detecting the returned laser beam comprises:
counting photons returned from the surface; and
generating signals responsive to the number of the returned photons.

24. The method of imaging in claim 17, wherein the step of detecting the returned laser beam is effected by a two-dimensional array of pixellated detectors and a multi-channel timing receiver wherein the number of channels is equal to the number of pixels of the array detectors.

25. The method of imaging in claim 17, wherein the step of processing signals responsive to the returned beam comprises:
producing a ranging signal responsive to the returned beam.

* * * * *